United States Patent
Dubery

(10) Patent No.: US 12,393,298 B2
(45) Date of Patent: Aug. 19, 2025

(54) METHOD AND APPARATUS FOR SENSING TOUCHES ON A CAPACITIVE TOUCH SCREEN

(71) Applicant: Microchip Touch Solutions Limited, Wokingham (GB)

(72) Inventor: John Dubery, Basingstoke (GB)

(73) Assignee: Microchip Touch Solutions Limited, Wokingham (GB)

( * ) Notice: Subject to any disclaimer, the term of this patent is extended or adjusted under 35 U.S.C. 154(b) by 6 days.

(21) Appl. No.: 18/436,189

(22) Filed: Feb. 8, 2024

(65) Prior Publication Data

US 2024/0272738 A1 Aug. 15, 2024

Related U.S. Application Data

(60) Provisional application No. 63/444,417, filed on Feb. 9, 2023.

(51) Int. Cl.
G06F 3/041 (2006.01)
G06F 3/044 (2006.01)

(52) U.S. Cl.
CPC .......... *G06F 3/0416* (2013.01); *G06F 3/044* (2013.01)

(58) Field of Classification Search
CPC .... G06F 3/04166; G06F 3/044; G06F 3/0416; G06F 3/0446
See application file for complete search history.

(56) References Cited

U.S. PATENT DOCUMENTS

| | | | |
|---|---|---|---|
| 2014/0104236 A1 | 4/2014 | Hamaguchi et al. | |
| 2016/0313823 A1* | 10/2016 | Tan | G06F 3/0446 |
| 2021/0064165 A1* | 3/2021 | Krah | G06F 3/0443 |
| 2022/0164085 A1 | 5/2022 | Knausz | |

FOREIGN PATENT DOCUMENTS

EP 1538548 A1 6/2005

OTHER PUBLICATIONS

International Search Report and Written Opinion of the International Searching Authority, Jun. 14, 2024, European Patent Office.

* cited by examiner

*Primary Examiner* — Insa Sadio
(74) *Attorney, Agent, or Firm* — Ryan M. Corbett; Shumaker, Loop & Kendrick, LLP

(57) ABSTRACT

A method of detecting a user touch on a capacitive touch screen may include generating drive signals for drive lines of the capacitive touch screen. The drive signals are encoded by codes that respectively specify polarities of the drive signals at different times. The codes may include a background code that specifies the same polarity for the drive signals, and the remaining codes are orthogonal to the background code and specify that half of the drive signals have a first polarity and half of the drive signals have a second opposite polarity. The method includes measuring output signals at sensing lines of the capacitive touch screen, which include values corresponding to the codes for the drive signals, and decoding the output signals to determine a touch has occurred based on the values of the output signals, by excluding values corresponding to the background code.

27 Claims, 16 Drawing Sheets

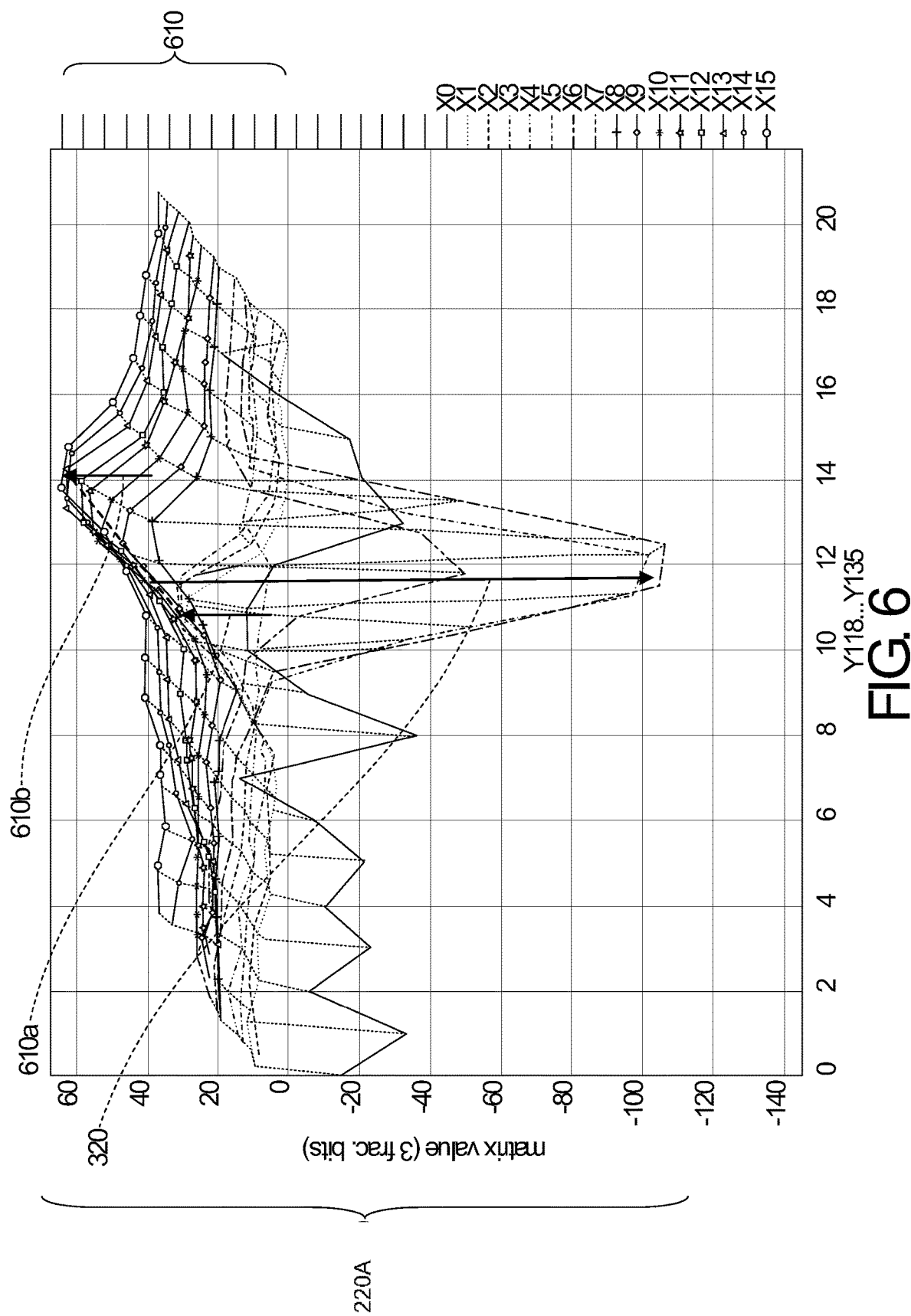

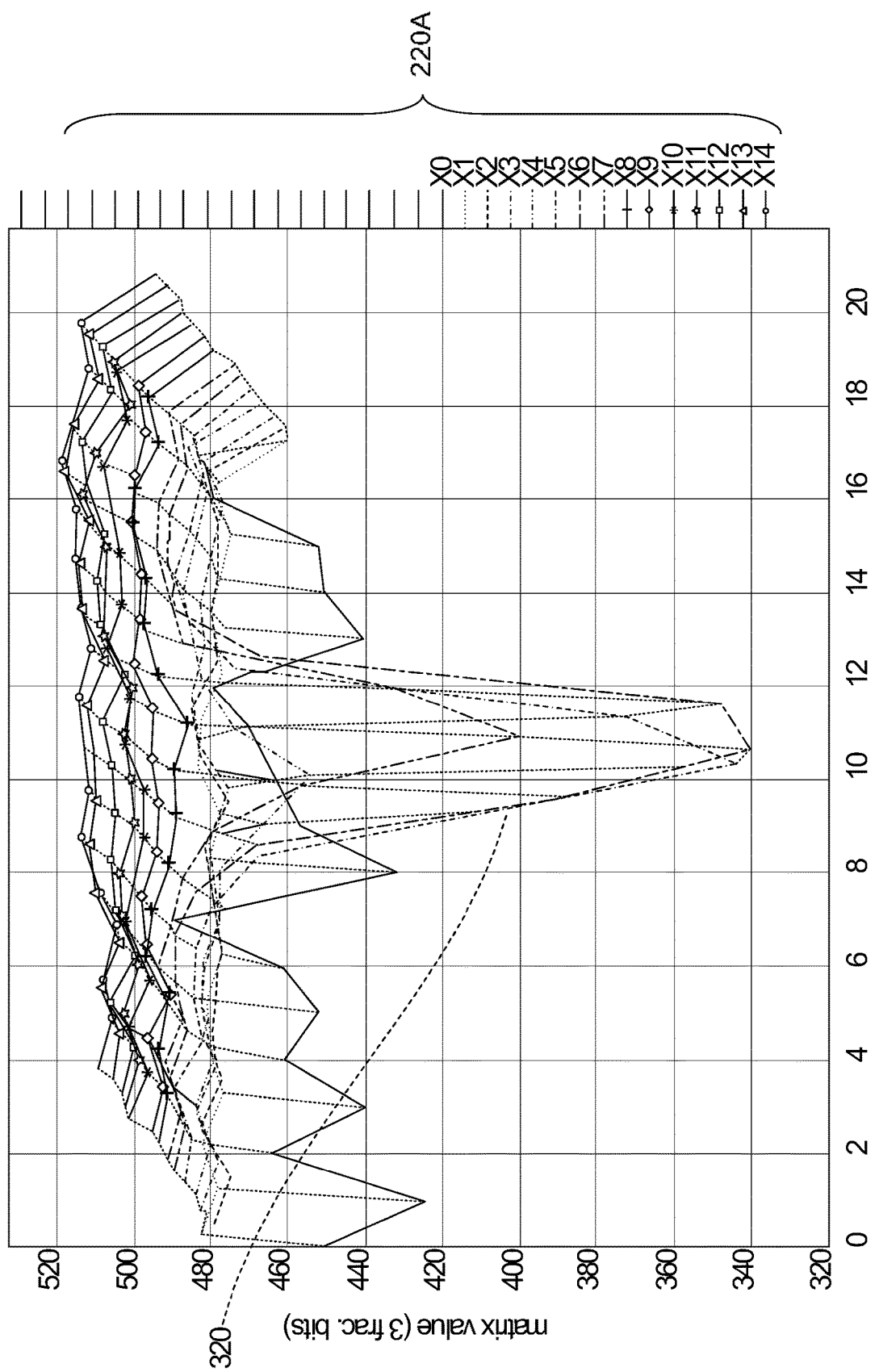

METHOD AND APPARATUS FOR SENSING TOUCHES ON A CAPACITIVE TOUCH SCREEN

CROSS-REFERENCE TO RELATED APPLICATION

The present application claims priority to U.S. Provisional Patent Application No. 63/444,417, filed on Feb. 9, 2023, the contents of which are hereby incorporated by reference in their entirety.

TECHNICAL FIELD

The present disclosure relates generally to capacitive touch screens, and more specifically to detecting touches using DC-free code division multiplexing (CDM).

SUMMARY

According to an aspect of various examples, a method of detecting a user touch on a capacitive touch screen is provided. The method may include generating a plurality drive signals to respectively drive a plurality of drive lines of the capacitive touch screen, wherein the plurality of drive signals are encoded by a plurality of codes that respectively specify polarities of the plurality of drive signals at different times, wherein the plurality of codes include a background code that specifies the same polarity for the respective drive signals, and the remaining codes of the plurality of codes are orthogonal to the background code, measuring a plurality of output signals at a respective plurality of sensing lines of the capacitive touch screen, wherein the plurality of output signals respectively include a plurality of values corresponding to the plurality of codes for the respective drive signals, and decoding the plurality of output signals to determine a touch of the capacitive touch screen has occurred based on the values of the plurality of output signals, wherein the decoding excludes values of the plurality of output signals corresponding to the background code.

The method may include replacing the values of the plurality of output signals corresponding to the background code with replacement values, so as to thereby exclude values of the plurality of output signals corresponding to the background code. The replacement values may be zeroes. The method may include subtracting an offset component from one or more of the plurality of output signals corresponding to one or more sensing lines of the capacitive touch screen. The offset component may correspond to an offset component of an output signal corresponding to an untouched part of the capacitive touch screen.

According to another aspect of various examples, there is provided a method of detecting a user touch on a capacitive touch screen. The method may include generating a plurality of drive signals to respectively drive a plurality of drive lines of the capacitive touch screen, wherein the plurality of drive signals are encoded by a plurality of codes that respectively specify polarities of the plurality of drive signals at different times, wherein the number of drive lines is greater than the number of codes, and wherein the plurality of codes are mutually orthogonal and respectively specify that half of the drive signals have a first polarity and half of the drive signals have a second polarity that is opposite the first polarity, measuring a plurality of output signals at a respective plurality of sensing lines of the capacitive touch screen, wherein the plurality of output signals respectively include a plurality of values corresponding to the plurality of codes for the respective drive signals, and decoding the plurality of output signals to determine a touch of the capacitive touch screen has occurred based on the values of the plurality of output signals.

The method may include subtracting an offset component from one or more of the plurality of output signals corresponding to one or more sensing lines of the capacitive touch screen. The offset component may correspond to an offset component of an output signal corresponding to an untouched part of the capacitive touch screen.

According to another aspect of various examples, there is provided a method of detecting a user touch on a capacitive touch screen. The method may include generating a plurality of drive signals to respectively drive a plurality of drive lines of the capacitive touch screen, wherein capacitive touch screen includes at least one drive line that is not driven by any of the drive signals, wherein the plurality of drive signals are encoded by a plurality of codes that respectively specify polarities of the plurality of drive signals at different times, wherein the plurality of codes include a background code that specifies the same polarity for the respective drive signals, and the remaining codes of the plurality of codes are orthogonal to the background code, measuring a plurality of output signals at a respective plurality of sensing lines of the capacitive touch screen, wherein the plurality of output signals respectively include a plurality of values corresponding to the plurality of codes for the respective drive signals, and decoding the plurality of output signals to determine a touch of the capacitive touch screen has occurred based on the values of the plurality of output signals, wherein the decoding excludes values of the plurality of output signals corresponding to the background code.

The method may include determining an offset component based on an output signal for the at least one drive line that is not driven by any of the drive signals, and subtracting the offset component from one or more of the plurality of output signals corresponding to one or more sensing lines of the capacitive touch screen.

According to an aspect of various examples, there is provided a capacitive touch screen controller to detect a user touch on a capacitive touch screen. The capacitive touch screen controller may include processing circuitry to generate a plurality of drive signals to respectively drive a plurality of drive lines of the capacitive touch screen, wherein the plurality of drive signals are encoded by a plurality of codes that respectively specify polarities of the plurality of drive signals at different times, wherein the plurality of codes include a background code that specifies the same polarity for the respective drive signals, and the remaining codes of the plurality of codes are orthogonal to the background code, measure a plurality of output signals at a respective plurality of sensing lines of the capacitive touch screen, wherein the plurality of output signals respectively include a plurality of values corresponding to the plurality of codes for the respective drive signals, and decode the plurality of output signals to determine a touch of the capacitive touch screen has occurred based on the values of the plurality of output signals, wherein values of the plurality of output signals corresponding to the background code are excluded to decode the plurality of output signals.

The processing circuitry may replace the values of the plurality of output signals corresponding to the background code with replacement values, so as to thereby exclude values of the plurality of output signals corresponding to the background code. The replacement values may be zeroes. The processing circuitry may subtract an offset component from one or more of the plurality of output signals corresponding to one or more sensing lines of the capacitive touch screen.

According to an aspect of various examples, there is provided a capacitive touch screen controller to detect a user touch on a capacitive touch screen. The capacitive touch screen controller may include processing circuitry to generate a plurality of drive signals to respectively drive a plurality of drive lines of the capacitive touch screen, wherein the plurality of drive signals are encoded by a plurality of codes that respectively specify polarities of the plurality of drive signals at different times, wherein the number of drive lines is greater than the number of codes, and wherein the plurality of codes are mutually orthogonal and respectively specify that half of the drive signals have a first polarity and half of the drive signals have a second polarity that is opposite the first polarity, measure a plurality of output signals at a respective plurality of sensing lines of the capacitive touch screen, wherein the plurality of output signals respectively include a plurality of values corresponding to the plurality of codes for the respective drive signals, and decode the plurality of output signals to determine a touch of the capacitive touch screen has occurred based on the values of the plurality of output signals.

The processing circuitry may subtract an offset component from one or more of the plurality of output signals corresponding to one or more sensing lines of the capacitive touch screen. The offset component may correspond to an offset component of an output signal corresponding to an untouched part of the capacitive touch screen.

According to an aspect of various examples, there is provided a capacitive touch screen controller to detect a user touch on a capacitive touch screen. The capacitive touch screen controller may include processing circuitry to generate a plurality of drive signals to respectively drive a plurality of drive lines of the capacitive touch screen, wherein capacitive touch screen includes at least one drive line that is not driven by any of the drive signals, wherein the plurality of drive signals are encoded by a plurality of codes that respectively specify polarities of the plurality of drive signals at different times, wherein the plurality of codes include a background code that specifies the same polarity for the respective drive signals, and the remaining codes of the plurality of codes are orthogonal to the background code, measure a plurality of output signals at a respective plurality of sensing lines of the capacitive touch screen, wherein the plurality of output signals respectively include a plurality of values corresponding to the plurality of codes for the respective drive signals, and decode the plurality of output signals to determine a touch of the capacitive touch screen has occurred based on the values of the plurality of output signals.

The processing circuitry may replace the values of the plurality of output signals corresponding to the background code with replacement values, so as to thereby exclude values of the plurality output signals corresponding to the background code. The replacement values may be zeroes. The processing circuitry may determine an offset component based on an output signal for the at least one drive line that is not driven by any of the drive signals, and subtract the offset component from one or more of the plurality of output signals corresponding to one or more sensing lines of the capacitive touch screen.

According to an aspect of various examples, there is provided a capacitive touch screen controller to detect a user touch on a capacitive touch screen. The capacitive touch screen controller may include processing circuitry to generate a plurality of drive signals to respectively drive a plurality of drive lines of the capacitive touch screen, wherein the capacitive touch screen includes at least one drive line that is not driven by any of the drive signals, wherein the plurality of drive signals are encoded by a plurality of codes that respectively specify polarities of the plurality of drive signals at different times, wherein the number of drive lines is greater than the number of codes, and wherein the plurality of codes are mutually orthogonal and respectively specify that half of the drive signals have a first polarity and half of the drive signals have a second polarity that is opposite the first polarity, measure a plurality of output signals at a respective plurality of sensing lines of the capacitive touch screen, wherein the plurality of output signals respectively include a plurality of values corresponding to the plurality of codes for the respective drive signals, and decoding the plurality of output signals to determine a touch of the capacitive touch screen has occurred based on the values of the plurality of output signals.

The processing circuitry may determine an offset component based on an output signal for the at least one drive line that is not driven by any of the drive signals, and subtract the offset component from one or more of the plurality of output signals corresponding to one or more sensing lines of the capacitive touch screen.

BRIEF DESCRIPTION OF DRAWINGS

FIG. 6 shows an illustration of 16 output signals according to various examples that substantially removes a mean background screen response component, and includes an offset component.

FIG. 7 shows an illustration of 16 output signals according to various examples that substantially removes a mean background screen response component, and removes an offset component.

DETAILED DESCRIPTION OF VARIOUS EXAMPLES

Figure 1A:
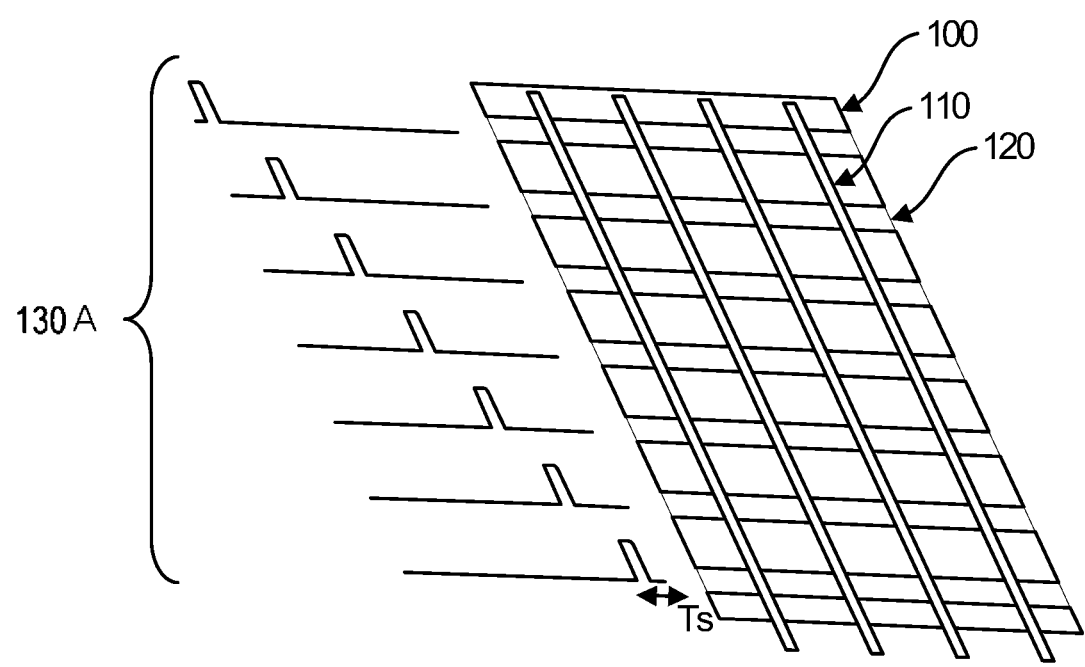
FIG. 1A shows a capacitive touch screen panel and an example of a time-interleaved sensing method, or time division multiplexing (TDM) according to the prior art.

Reference will now be made in detail to the following various examples, which are illustrated in the accompanying drawings, wherein like reference numerals refer to like elements throughout. The following examples may be embodied in various forms without being limited to the examples set forth herein.

Figure 1B:
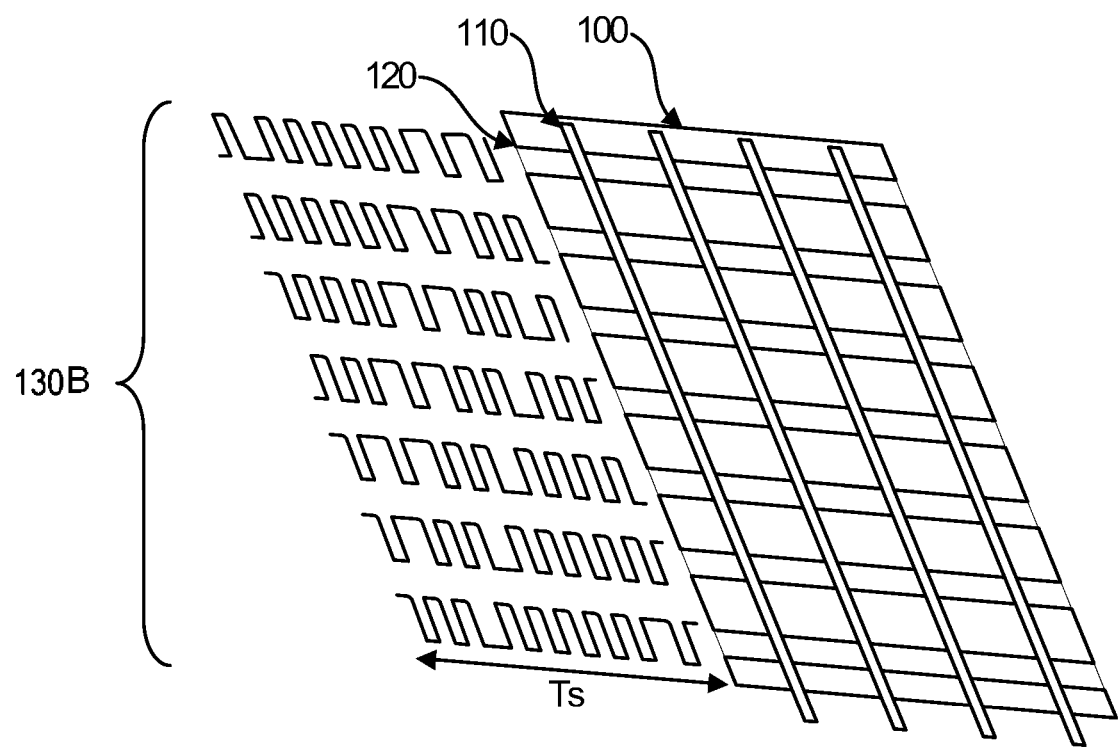
FIG. 1B shows a capacitive touch screen panel and an example of a code division multiplexing sensing (CDMS) method according to the prior art.

FIGS. 1A and 1B shows two examples of a capacitive touch screen 100 and sensing methods according to the prior art. The capacitive touch screen 100 may be coupled to a touch screen controller (not shown) which may be used together to detect the presence and location of a touch or the proximity of an object within a touch-sensitive area of the touch screen panel 100. Herein, reference to a touch screen panel may encompass both the touch screen panel and its touch screen controller, where appropriate. Similarly, reference to a touch screen controller may encompass both the touch screen controller and its touch screen panel, where appropriate. The capacitive touch screen 100 may include one or more touch-sensitive areas, where appropriate. The capacitive touch screen 100 may include an array of transmit (TX) or "drive" electrodes 120 and receive (RX), or "sense" electrodes 110 (or an array of electrodes of a single type) disposed on one or more substrates, which may be made of a dielectric material. Herein, reference to a touch screen panel may encompass both the electrodes of the touch screen panel and the substrate(s) that they are disposed on, where appropriate. Alternatively, where appropriate, reference to a touch screen panel may encompass the electrodes of the touch screen panel, but not the substrate(s) that they are disposed on. In addition, references herein to a "drive line" or "sense line" refers respectively to a "drive electrode" and "sense electrode," and vice versa.

An electrode may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), where appropriate. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material, and the fine lines of conductive material may occupy approximately 5% of the area of its shape in a hatched, mesh, or other suitable pattern.

A mechanical stack may contain the substrate (or multiple substrates) and the conductive material forming the drive electrodes 120 and sense electrodes 110 of the capacitive touch screen 100. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive electrodes 120 or sense electrodes 110. The mechanical stack may also include a second layer of OCA and a dielectric layer (which may be made of PET or another suitable material, similar to the substrate with conductive material forming the other of the drive electrodes 120 or sense electrodes 110). As an alternative, where appropriate, a thin coating of a dielectric material may be applied instead of the second layer of OCA and the dielectric layer. The second layer of OCA may be disposed between the substrate with the conductive material making up the other of the drive electrodes 120 or sense electrodes 110 and the dielectric layer, and the dielectric layer may be disposed between the second layer of OCA and an air gap to a display of a device including the capacitive touch screen 100 and the touch screen controller. As an example only and not by way of limitation, the cover panel may have a thickness of approximately 1 mm; the first layer of OCA may have a thickness of approximately 0.05 mm; the substrate with the conductive material forming the drive electrodes 120 or sense electrodes 110 may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses.

The capacitive touch screen 100 may implement a hybrid capacitive form of touch sensing, which may include both mutual- and self-capacitance sensing modes of operation in a capacitive sensor. In a mutual-capacitance implementations or modes of operation, the capacitive touch screen 100 may include an array of drive electrodes 120 and sense electrodes 110 forming an array of capacitive nodes. An overlapping area of a drive electrode 120 and a sense electrode 110 may form a capacitive node. The drive and sense electrodes 120, 110 forming the capacitive node may come near each other, but not make electrical contact with each other. Instead, the drive and sense electrodes 120, 110 may be capacitively coupled to each other across a space between them. A pulsed or alternating voltage applied to the drive electrode 120 (by the touch screen controller) may induce a charge on the sense electrode 110, and the amount of charge induced may be susceptible to external influence (such as a touch or the proximity of an object). When an object touches or comes within proximity of the capacitive node, a change in capacitance may occur at the capacitive node and the touch screen controller may measure the change in capacitance. By measuring changes in capacitance throughout the array, the touch screen controller may determine the position of the touch or proximity within the touch-sensitive area(s) of capacitive touch screen 100.

In self-capacitance implementations or modes of operation, the touch screen panel may include an array of electrodes of a single type that may each form a capacitive node. In some embodiments, the touch screen panel may include an array of driven and grounded electrodes (not shown), with each area overlap between the driven and grounded electrode forming a capacitive node. When an object touches or comes within proximity of the capacitive node, a change in self-capacitance may occur at the capacitive node and the touch screen controller may measure the change in capacitance, for example, as a change in the amount of charge needed to raise the voltage at the capacitive node by a pre-determined amount. As with a mutual-capacitance implementation, by measuring changes in capacitance throughout the array, the touch screen controller may determine the position of the touch or proximity within the touch-sensitive area(s) of the touch screen panel. This disclosure contemplates any suitable form of capacitive touch sensing, where appropriate.

As described above, a change in capacitance at a capacitive node of touch screen panel may indicate a touch or proximity input at the position of the capacitive node. The touch screen controller may detect and process the change in capacitance to determine the presence and location of the touch or proximity input. The touch screen controller may then communicate information about the touch or proximity input to one or more other components (such one or more central processing units (CPUs)) of a device that includes the touch screen panel and the touch screen controller, which may respond to the touch or proximity input by initiating a function of the device (or an application running on the device). Although this disclosure describes a particular touch screen controller having particular functionality with respect to a particular device and a particular touch screen panel, this disclosure contemplates any suitable touch screen controller having any suitable functionality with respect to any suitable device and any suitable touch screen panel.

The touch screen controller may include processing circuitry that may include one or more integrated circuits (ICs), such as for example general-purpose microprocessors, microcontrollers, programmable logic devices or arrays, application-specific ICs (ASICs). In various examples, the touch screen controller may include a computer system having, for example, a processor, memory, storage, and communication interfaces. In various examples, the touch screen controller may include analog circuitry, digital logic, and digital non-volatile memory. In various examples, the touch screen controller may be disposed on a flexible printed circuit (FPC) bonded to the substrate of the touch screen panel, as described below. The FPC may be active or passive, where appropriate. In particular embodiments, multiple touch screen controllers may be disposed on the FPC. The touch screen controller may include a processor, a drive circuit, a sense circuit, and a storage circuit. The drive circuit may supply drive signals to the drive electrodes 120 of the capacitive touch screen 100. The sense circuit may sense charge at the capacitive nodes of the touch screen panel and provide measurement signals to the processor representing capacitances at the capacitive nodes. The processor may control the supply of drive signals to the drive electrodes 120 by the drive circuit and process measurement signals from the sense circuit to detect and process the presence and location of a touch or proximity input within the touch-sensitive area(s) of capacitive touch screen 100. The processor may also track changes in the position of a touch or proximity input within the touch-sensitive area(s) of the capacitive touch screen 100. The storage circuit may store programming for execution by the processor, including programming for controlling the drive circuit to supply drive signals to the drive electrodes, programming for processing measurement signals from the sense circuit, and other suitable programming, where appropriate. Although this disclosure describes a particular touch screen controller having a particular implementation with particular components, this disclosure contemplates any suitable touch screen controller having any suitable implementation with any suitable components.

Referring again to FIG. 1A, an example of a time-interleaved sensing method, or time division multiplexing (TDM) according to the prior art is shown. FIG. 1B shows an example of a code division multiplexing sensing (CDMS) method according to the prior art. Touch sensor systems using time division multiplexing (TDM) schemes on the drive lines 120 require scanning of the drive line 120 and sense line 110 pairs ("drive-sense pairs") separately at differing times to detect pulses that are sequentially transmitted in a plurality of drive signals 130A. These schemes may thus limit the amount of sensing time (Ts) that may be devoted to each drive-sense pair on the touch sensor. In addition, touch sensor designs using TDM may not adequately address noise signals that may appear on the sense lines due to environmental or other types of interference. This may lead to low signal to noise ratios (SNRs) of the sensed signals.

Various examples of the present disclosure may incorporate CDM to enhance SNR on sensed signals and to allow for additional sensing time Ts for each drive line 120 and sense line 110 pair. As shown in FIG. 1B, the sensing time Ts in the example incorporating CDM may be much longer than that of system using TDM. This is because CDM systems may allow for multi-line drive signal 130 transmissions to temporally coexist while being fully discernable at the receiver. In other words, the codes assigned to the drive signals 130 in CDM systems distinguish those particular drive signals 130 from the other drive signals 130 on the capacitive touch screen 100, whereas TDM systems require the drive signals 130 to be sent during separate time windows so that they may be distinguished from one another.

Figure 2:
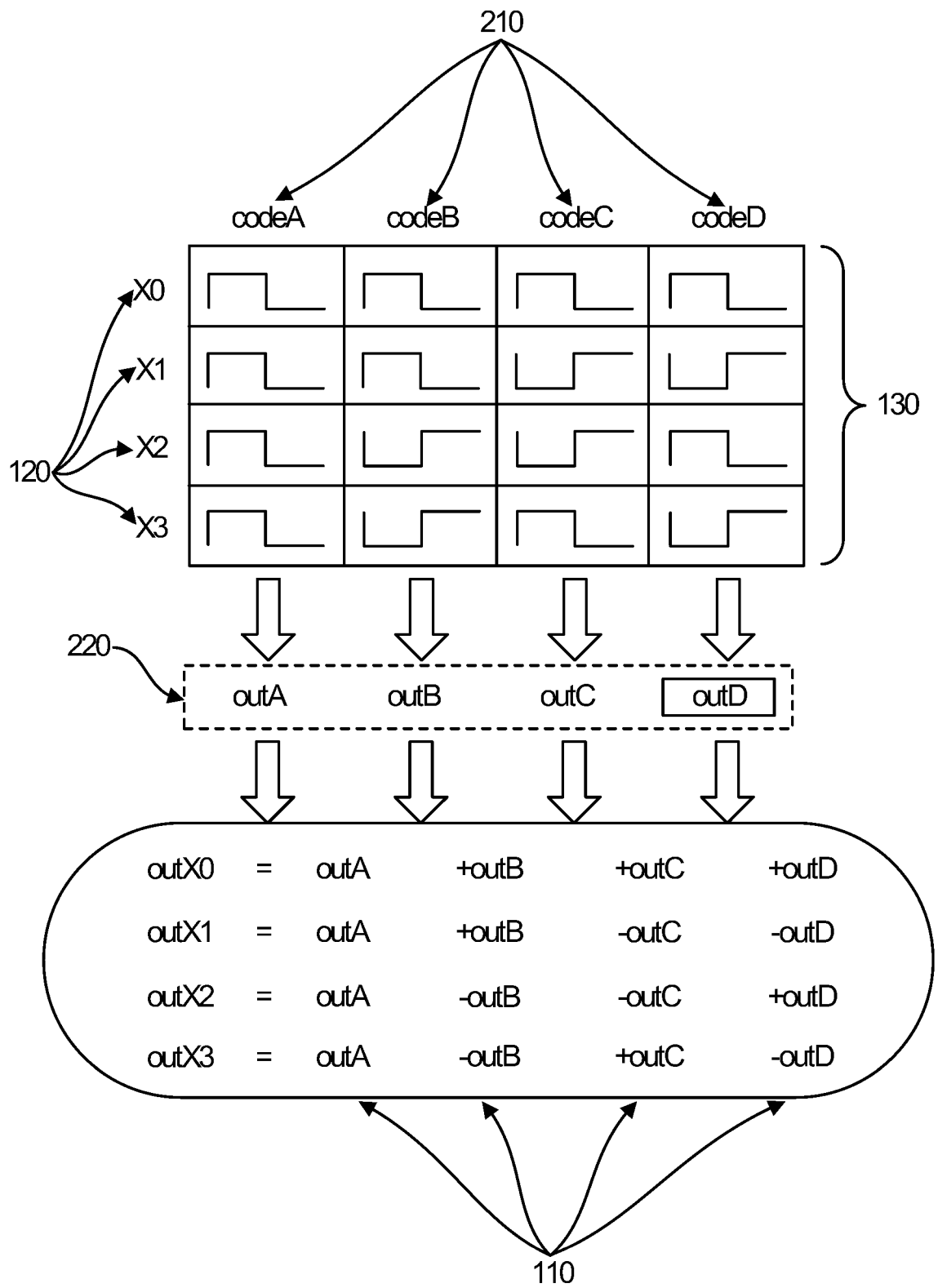
FIG. 2 illustrates a set of codes used to encode a plurality of drive signals according to various examples.

FIG. 2 illustrates a set of codes used to encode a plurality of drive signals according to various examples. Referring to FIG. 2, a plurality of drive lines 120 (X0, X1, X2, and X3) may receive a plurality of drive signals 130 encoded according to a plurality of codes 210 (codeA, codeB, codeC, and codeD), which may be referred to herein as a "code set." In this example, four drive lines 120 are used for simplification, however, any other suitable number of drive lines 120 may be used (e.g., 16, 32, 64, etc.). The plurality of codes 210 may be in any suitable form, however in the example of FIG.

2, the codes 210 include square waveforms with positive and negative signals. For instance, codeA indicates a positive signal (1, 1, 1, 1) is applied to each of the four example drive lines 120 simultaneously. In some examples the individual signals of the code are called chips, and thus the chips of CodeA are all of a like polarity. CodeB, transmitted on each of the four example drive lines 120 simultaneously, after the transmission of CodeA, indicates a positive signal is applied to drive lines X0 and X1, and a negative signal is applied to drive lines X2 and X3: (1, 1, −1, −1). CodeC, transmitted on each of the four example drive lines 120 simultaneously, after the transmission of CodeB, indicates a positive signal is applied to drive lines X0 and X3, and a negative signal is applied to drive lines X1 and X2: (1, −1, −1, 1). CodeD, transmitted on each of the four example drive lines 120 simultaneously, after the transmission of CodeC, indicates a positive signal is applied to drive lines X0 and X2, and a negative signal is applied to drive lines X1 and X3: (1, −1, 1, −1). Each code of the plurality of codes 210 may include any number of drive pulses per code. For example, codeA may include three positive pulses applied to each drive line 120, followed by codeB causing three positive pulses to be applied to drive lines X0 and X1 and three negative pulses to be applied to drive lines X2 and X3, without limitation. According to an example embodiment, each of the codes may be orthogonal to each of the other codes, so that the resulting signals may be decoded without interference.

A plurality of output signals 220A may be respectively measured at the plurality of sensing lines 110 for each code, herein denoted as outA, outB, outC, and outD. Each of the output signals 220A may include a component for each drive signal 130 that corresponds to the code that was applied. For example, the output signal outA may include a component for outX0, outX1, outX2, and outX3, respectively. According to the example shown in FIG. 2, the output signal components outX0, outX1, outX2, and outX3 has the same positive output signal component value outA, without reference to amplitude. By contrast, the output signal outB, which corresponds to codeB, includes output signal component values +outB, +outB, −outB, and −outB for output signal components outX0, outX1, outX2, and outX3, respectively. The output signals outC and outD likewise have two positive output signal component values and two negative output signal component values.

Figure 3:
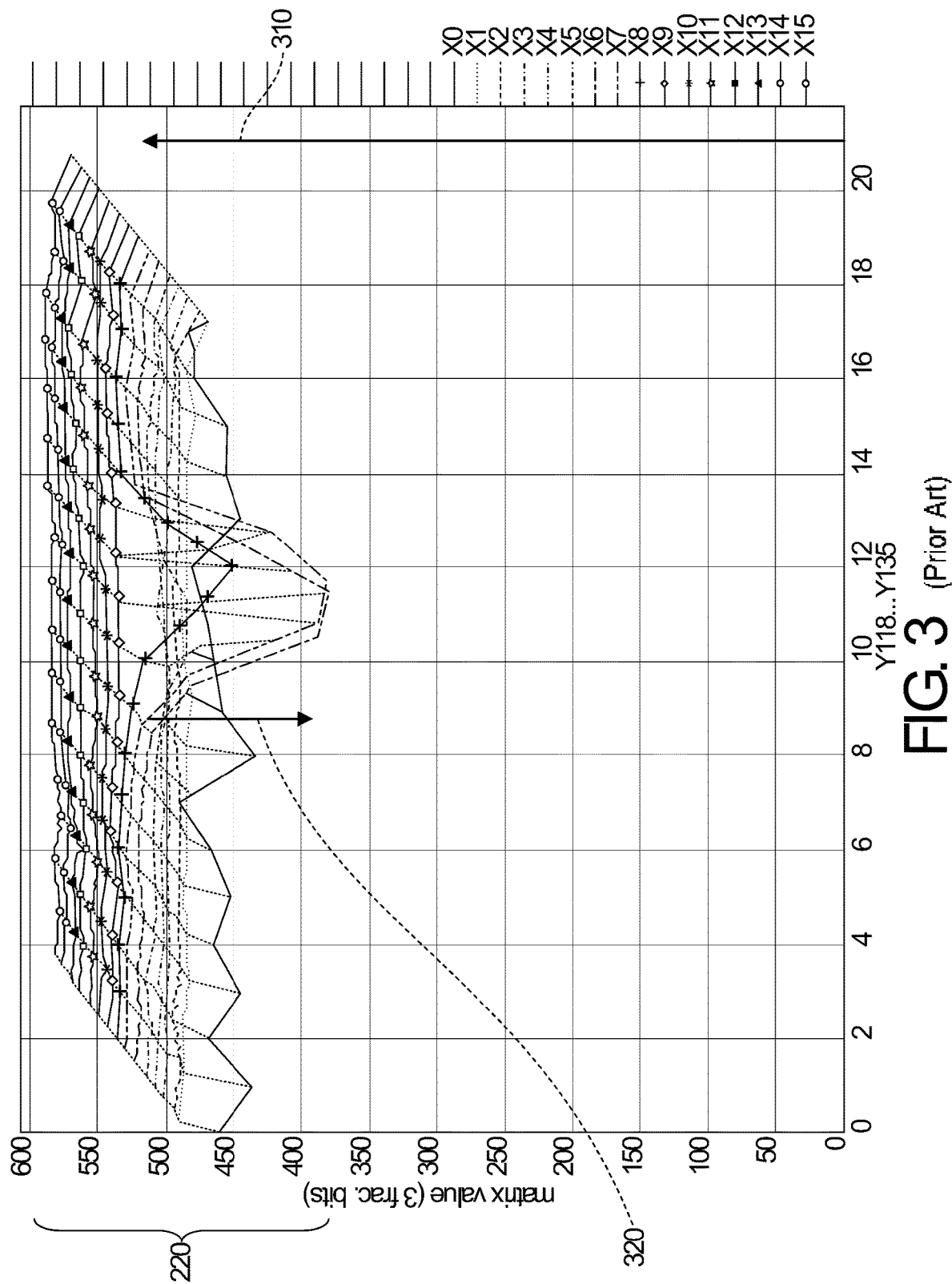
FIG. 3 shows an illustration of 16 output signals according to the prior art that includes a mean background screen response component.

The output signals 220A may include components from three or more sources: (1) a mean of background screen responses when no touch is present on the capacitive touch screen 100, (2) a variation of the background screen responses when no touch is present on the capacitive touch screen 100, and (3) a touch on the touch screen panel. FIG. 3 shows an illustration of 16 output signals 220 according to the prior art. As shown in FIG. 3, the output signals 220 includes a mean background screen response 310 that makes up the largest component of each output signal 220. Some of the output signals 220 include a touch response component 320, indicated by a dip in the output signals 220, that indicates a touch has occurred at those drive lines 120, however, the touch response component 320 is substantially less than the mean background screen response component 310. The touch screen controller functions to detect touches on the touch screen panel, and therefore wastes resources measuring the mean background screen response component 310 of the output signals 220 in addition to the touch response component 320 of the output signals 220.

Referring back to FIG. 2, some of the plurality of codes 210 (i.e., codeB, codeC, and codeD) are balanced, by having the same number of positive output signal components and negative output signal components. CodeA, by contrast, is made up of chips having a uniform polarity. For a balanced code, the measured output signals outB, outC, and outD substantially cancel out the mean background screen response components 310, and substantially only include the touch response component 320 and variation in the background response. By contrast, the output signal outA corresponding to codeA includes four positive output signal components, which substantially represents the unwanted mean background screen response component 310, or "DC" component. As noted above, the codes are orthogonal with each other. When decoding the result, aspects of this disclosure omit the output signals 220A resulting from the transmission of codeA, i.e. outX0=+outB, +outC+outD; outX1−+outB, −outC, −outD; outX2=−outB, −outC, +outD; and outX3=−outB, +outC, −outD. By excluding the values of the output signals corresponding to codeA when decoding the signals, the unwanted mean background screen response component 310 can be substantially removed from the measured output signals 220, which preserves resources for detecting the touch response component 320 in the measured output signals 220, which is referred to herein as a DC-free measurement.

Figure 4:
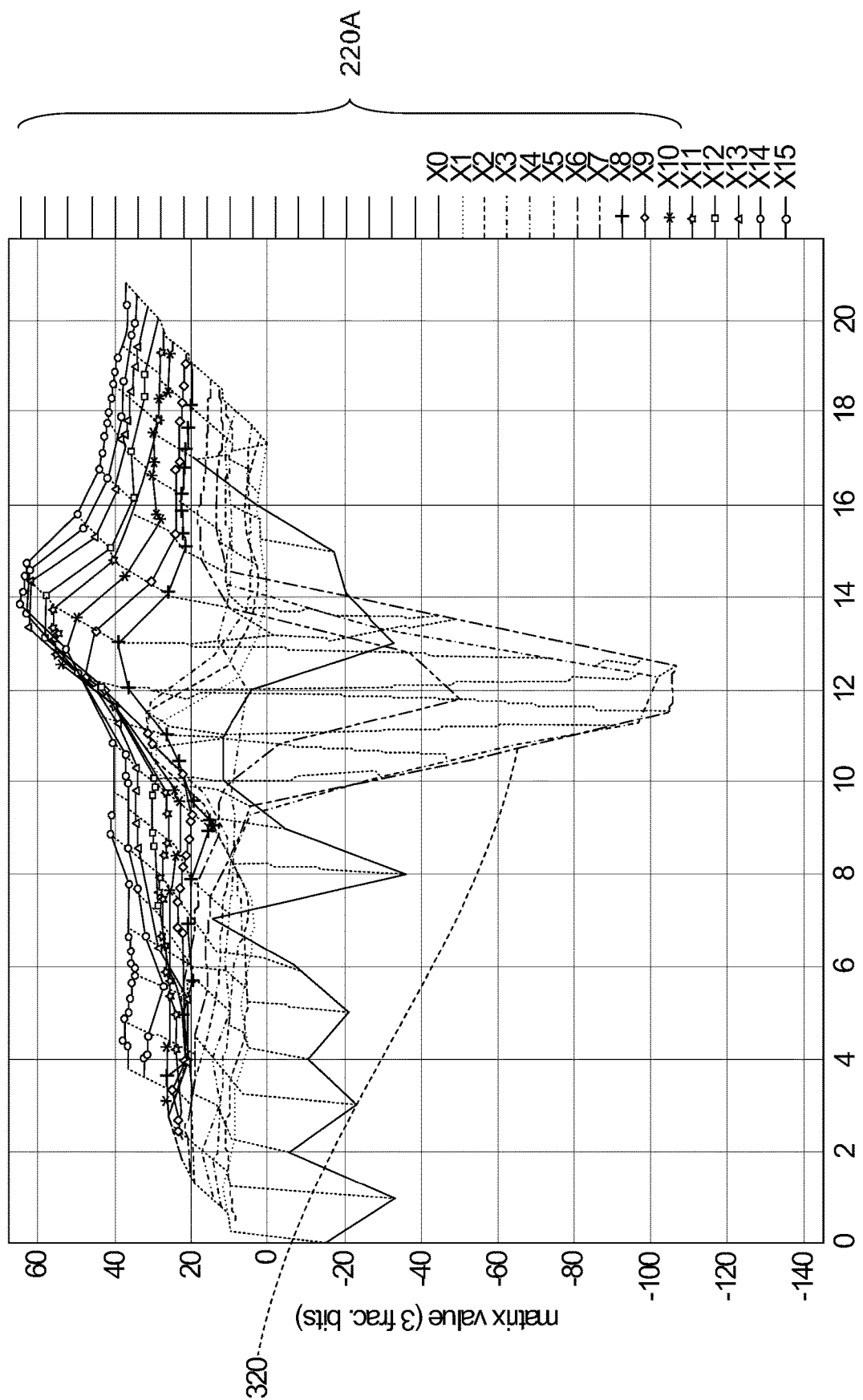
FIG. 4 shows an illustration of 16 output signals according to various examples that substantially removes a mean background screen response component.

For example, FIG. 4 shows an illustration of 16 measured output signals 220A according to various examples in which the mean background screen response component 310 has been substantially removed by omitting the output signals 220A resulting from the transmission of codeA when decoding. As compared to the scale of the y-axis in FIG. 3, the scale of the y-axis in FIG. 4 is much smaller because the mean background screen response component 310 is not included in the measured output signals 220. As shown in FIG. 4, the touch response component 320 is the largest component of the measured output signals 220. Therefore, touches on the capacitive touch screen 100 may be more easily detected with the mean background screen response component 310 substantially eliminated.

Figure 5A:
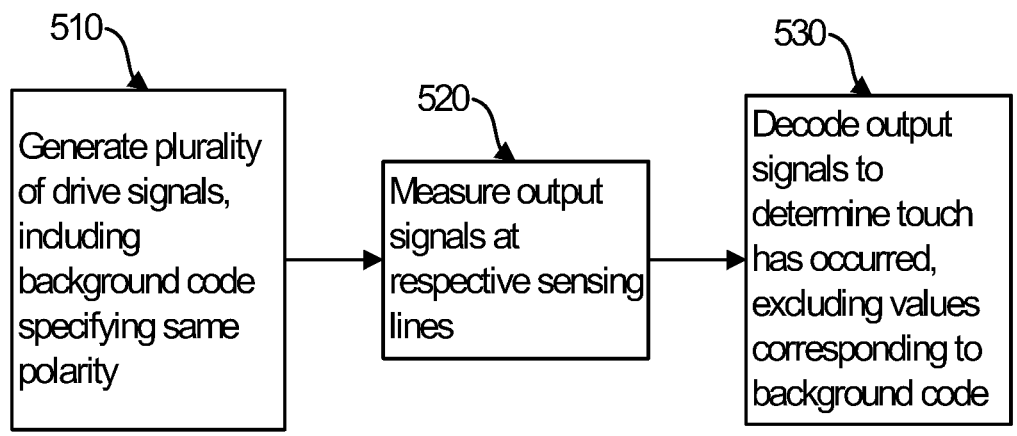
FIG. 5A shows a method of detecting a user touch on a capacitive touch screen according to various examples in which a mean background screen response component is substantially removed using a background code.

The present disclosure includes various examples of a method of detecting a user touch on a capacitive touch screen that may substantially remove the mean background screen response component. For example, FIG. 5A illustrates a method of detecting a user touch on a capacitive touch screen according to various examples. The method may include a step 510 generating a plurality of drive signals to respectively drive a plurality of drive lines of the capacitive touch screen 100. The plurality of drive signals may be encoded by a plurality of codes that respectively specify the polarities of the plurality of drive signals at different times.

For example, as explained in connection with FIG. 2, codeA may specify the polarity of the drive signals 130 applied to drive lines 120. CodeB may subsequently specify the polarity of the drive signals 130 applied to drive lines 120 after codeA. CodeC and CodeD are in turn used to specify the polarity of the drive signals 130 applied to drive lines 120 after codeB. As described above, the plurality of codes may include a background code (e.g., codeA) that specifies the same polarity for the respective drive signals 130, which polarity may be positive or negative. The remaining codes (e.g., codeB, codeC, and codeD) may be orthogonal to the background code (e.g., the dot product of the background code (e.g., codeA) and to each of the remaining codes (e.g., codeB, codeC, and codeD) is zero), and may respectively specify that half of the drive signals have a first polarity and half of the drive signals have a second polarity that is opposite the first polarity. For example, codeB, codeC, and codeD each specify a positive polarity for two drive signals, and a negative polarity for two drive signals. Because the background code specifies the same polarity for all of the drive signals 130, the mean background screen response component, or DC component, 310 is contained in the background code. Because the remaining codes are orthogonal to the background code, the remaining codes do not include the mean background screen response component.

The method may also include a step 520 of measuring a plurality of output signals 220A at a respective plurality of sensing lines 110 of the capacitive touch screen 100. The plurality of output signals 220A may respectively include a plurality values corresponding to the plurality of codes 210 for the respective drive signals 130. For example, for a capacitive touch screen that includes 16 drive lines that are driven by 16 drive signals encoded using 16 codes that specify the polarity of the drive signals for each drive line, the output signal for each sense line will have 16 values that correspond to the 16 drive lines.

The method may include a step 530 of decoding the plurality of output signals to determine a touch of the capacitive touch screen has occurred based on the values of the plurality of output signals. For example, the output signal 220A for each sensing line may be vector multiplied by each of the plurality of codes 210 to obtain the contribution from each drive line 120. According to various examples, the values of the output signals 220A corresponding to the background code (i.e., the values of the output signals that were measured when the background code was applied to the drive signals) may be excluded in order to remove the mean background screen response component 310. According to various examples, the decoding step 530 may include the step of replacing the values of the plurality of output signals 220A corresponding to the background code with replacement values, and decoding the plurality of output signals 220A based on the replacement values and the values of the plurality of output signals 220A corresponding to the remaining codes of the plurality of codes 210. According to various examples, the replacement values may be zeroes, though other values may be used.

Figure 5B:
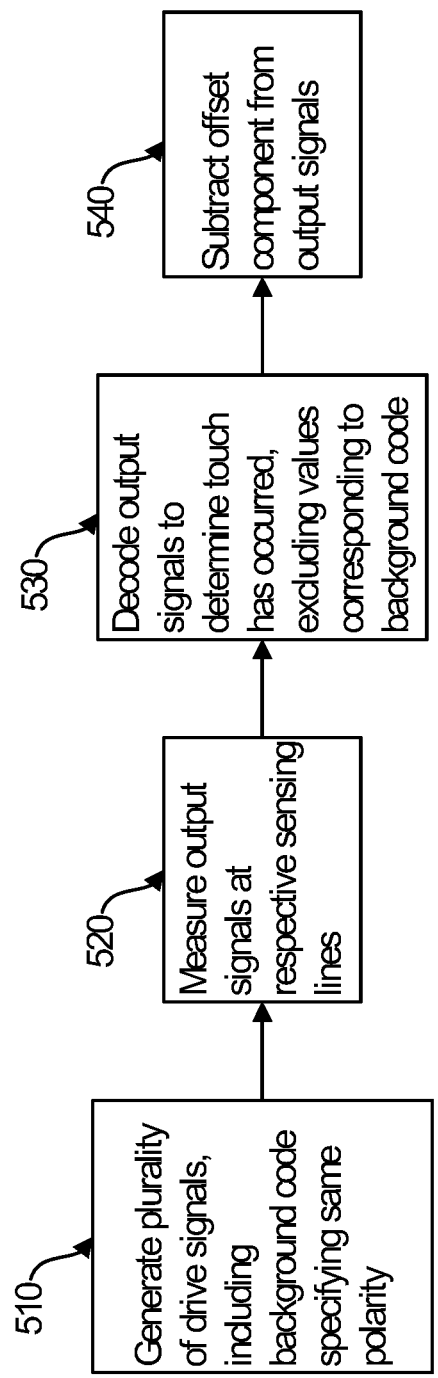
FIG. 5B shows a method of detecting a user touch on a capacitive touch screen according to various examples in which a mean background screen response component is substantially removed using a background code, and an offset component is substantially removed.

FIG. 5B shows a method of detecting a user touch on a capacitive touch screen according to various examples. The method of FIG. 5B is an extension of the method of FIG. 5A, and the steps previously described in connection with FIG. 5A are not repeated here. In the method of FIG. 5B, after the decoding step 530, an offset component is subtracted from one or more of the plurality of output signals in step 540. As explained in more detail below, according to various examples the offset component may correspond to an offset component of an output signal corresponding to an untouched part of the capacitive touch screen.

For example, FIG. 6 shows an illustration of 16 output signals 220A according to various examples that substantially remove a mean background screen response component 310, and includes an offset component 610. Referring to FIG. 6, as explained above, by substantially removing the mean background screen response component 310 of the output signals 220A, the touch response component 320 is the largest component of the output signals 220A. However, by substantially removing the mean background screen response component 310 (of FIG. 3), an offset component 610 may be introduced across various drive lines 120 when a touch is present, as shown in FIG. 6. The amplitude of the offset component 610 may be opposite the amplitude of the touch response component 320, which may complicate the processing needed to determine the touch position from the measured output signals 220.

The offset component 610 of the measured output signals may include one or more offset components corresponding to drive lines 120. For example, offset components 610a and 610b correspond to drive lines 120 located near opposite sides of the capacitive touch screen. As shown in FIG. 6, the touch data 320 indicates a touch that occurred between the drive lines 120 corresponding to offset components 610a and 610b. The offset component 610 corresponding to the drive lines where the touch occurred reduces the touch response component 320, which may make the touch response component 320 more difficult to detect. In order to substantially eliminate the offset component 610 from the output signal 220A corresponding to the drive lines 120 where the touch on the capacitive touch screen 100 occurred, it may be possible to subtract the offset component, e.g., 610a or 610b, from an untouched part of the capacitive touch screen 100. By subtracting from the offset component 610 for a touched part of the capacitive touch screen 100 an offset component 610a or 610b of an untouched part of the capacitive touch screen 100, the offset component 610 for the touched part of the capacitive touch screen 100 may be substantially eliminated. For example, FIG. 7 shows an illustration of 16 output signals from which the offset component 610 has been removed. As shown in FIG. 7, the touch response component 320 is greater than the touch response component of FIG. 6 because the offset component 610 has been removed. However, because a new touch could occur at any time, there is no way to guarantee that an "untouched" part of the touch screen panel will remain untouched when an offset component for that portion of the screen is used to subtract the offset component from a touched portion of the capacitive touch screen 100.

Therefore, there may be a need to identify an untouched line to provide the offset component, but that does not include touch data. Example methods of identifying untouched lines are described below.

Figure 8A:
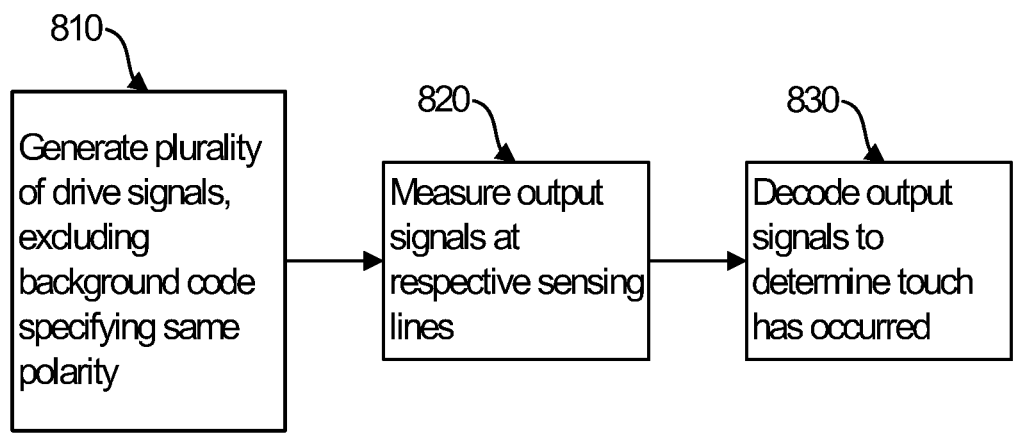
FIG. 8A shows a method of detecting a user touch on a capacitive touch screen according to various examples in which a mean background screen response component is substantially removed by excluding a background code.

FIG. 8A shows a method of detecting a user touch on a capacitive touch screen according to various examples. The method of FIG. 8A is similar to the method of FIG. 5A, except that background code is not generated for use with the drive signals 120. For example, in step 810 a plurality of drive signals 130 are generated to respectively drive a plurality of drive lines 120 of the capacitive touch screen 100. The plurality of drive signals may be encoded by a plurality of codes 210 that respectively specify the polarities of the drive signals 130 at different times. The number of drive lines 120 may be greater than the number of codes 210. For example, the capacitive touch screen may include 16 drive lines 120, and the plurality of codes 210 may include 15 codes, each with 16 chips. In contrast to the method of FIG. 5A, the plurality of codes 210 in FIG. 8A may exclude a background code that that specifies the same polarity for the respective drive signals 120. The plurality of codes used in the method of FIG. 8A may be mutually orthogonal, and may respectively specify that half of the drive signals have a first polarity and half of the drive signals have a second polarity that is opposite the first polarity.

The method of FIG. 8A may include a step 820 of measuring a plurality of output signals 220A at a respective plurality of sensing lines 110 of the capacitive touch screen 100. The plurality of output signals 220A may respectively include a plurality of values corresponding to the plurality of codes 210 for the respective drive signals 130. By excluding the background code, and using one fewer code than the number of drive lines, the output signals 220 do not include the mean background screen response component 310. In step 830, one or more of the plurality of output signals 220A is decoded to determine a touch of the capacitive touch screen 100 has occurred based on the values of the plurality of output signals, as explained above.

Figure 8B:
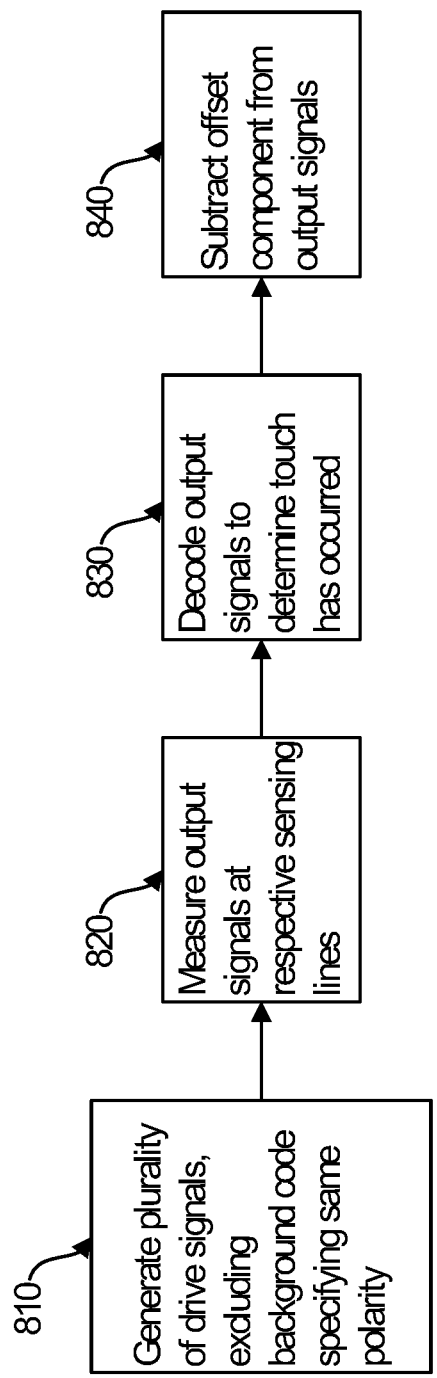
FIG. 8B shows a method of detecting a user touch on a capacitive touch screen according to various examples in which a mean background screen response component is substantially removed by excluding a background code, and an offset component is substantially removed.

FIG. 8B shows a method of detecting a user touch on a capacitive touch screen according to various examples. The method of FIG. 8B is an extension of the method of FIG. 8A, and the steps previously described in connection with FIG. 8A are not repeated here. In the method of FIG. 8B, after the decoding step 830, an offset component is subtracted from one or more of the plurality of output signals 220A in step 840. As explained above, according to various examples the offset component may correspond to an offset component 610b of an output signal 220A corresponding to an untouched part of the capacitive touch screen 100. According to various examples, the offset component may correspond to an offset component of an output signal corresponding to at least one drive line that does not have a drive signal applied, or at least partially does not exist.

Figure 9A:
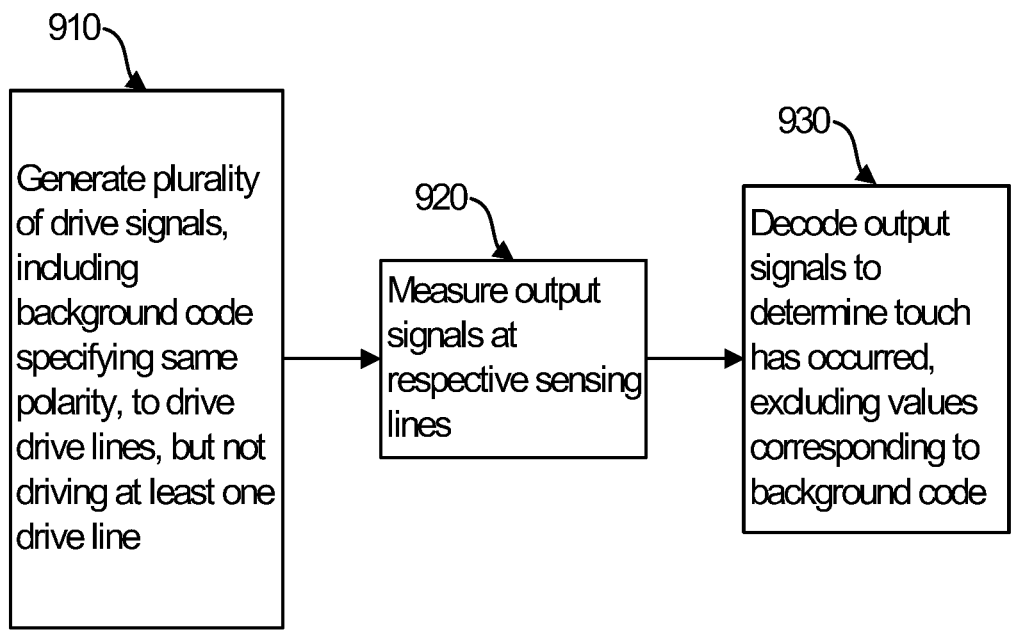
FIG. 9A shows a method of detecting a user touch on a capacitive touch screen according to various examples in which a mean background screen response component is substantially removed using a background code.

FIG. 9A illustrates a method of detecting a user touch on a capacitive touch screen according to various examples. The method of FIG. 9A is similar to the method of FIG. 5A, except that one of the drive lines 120 is not driven by a drive signal 130. The method of FIG. 9A may include a step 910 generating a plurality of drive signals to respectively drive a plurality of drive lines of the capacitive touch screen 100. The capacitive touch screen 100 may include at least one drive line 120 that is not driven by any of the drive signals 130. The plurality of drive signals 130 may be encoded by a plurality of codes 210 that respectively specify the polarities of the plurality of drive signals 130 at different times. The plurality of codes 210 include a background code that specifies the same polarity for the respective drive signals 130. The remaining codes of the plurality of codes 210 may be orthogonal to the background code and respectively specify that half of the drive signals have a first polarity and half of the drive signals have a second polarity that is opposite the first polarity.

The method of FIG. 9A may include step 920 of measuring a plurality of output signals 220A at a respective plurality of sensing lines 110 of the capacitive touch screen 100. The plurality of output signals 220A may respectively include a plurality values corresponding to the plurality of codes 210 for the respective drive signals 130. For example, for a capacitive touch screen that includes 16 drive lines that are driven by 15 drive signals encoded using 16 codes that specify the polarity of the drive signals for each drive line, the output signal for each sense line will 16 values that correspond to the 16 drive lines.

The method may include a step 930 of decoding the plurality of output signals to determine a touch of the capacitive touch screen has occurred based on the values of the plurality of output signals 220. For example, the output signal 220A for each sensing line may be vector multiplied by each of the plurality of codes 210 to obtain the contribution from each drive line 120. According to various examples, the values of the output signals 220A corresponding to the background code (i.e., the values of the output signals that were measured when the background code was applied to the drive signals) may be excluded in order to remove the mean background screen response component 310. According to various examples, the decoding step 930 may include the step of replacing the values of the plurality of output signals 220A corresponding to the background code with replacement values, and decoding the plurality of output signals 220A based on the replacement values and the values of the plurality of output signals 220A corresponding to the remaining codes of the plurality of codes 210. According to various examples, the replacement values may be zeroes, though other values may be used.

Figure 9B:
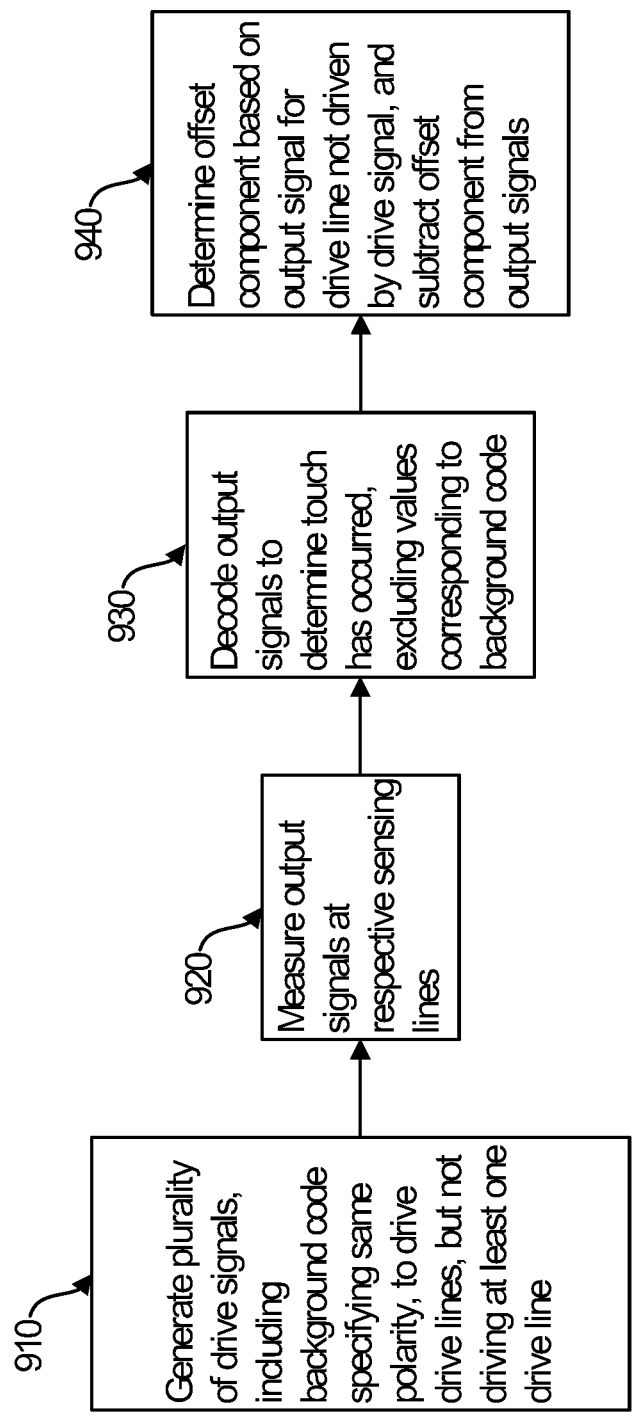
FIG. 9B shows a method of detecting a user touch on a capacitive touch screen according to various examples in which a mean background screen response component is substantially removed using a background code, and an offset component is substantially removed using an offset component corresponding to at least one drive that does not receive a drive signal.

FIG. 9B shows a method of detecting a user touch on a capacitive touch screen according to various examples. The method of FIG. 9B is an extension of the method of FIG. 9A, and the steps previously described in connection with FIG. 9A are not repeated here. In the method of FIG. 9B, after the decoding step 930, in step 940 an offset component is determined based on an output signal 220A for the at least one drive line that is not driven by any of the drive signals 130, and the determined offset component is subtracted from one or more of the plurality of output signals 220. Even though the plurality of codes 210 are not applied to one of the drive lines 120, the plurality of codes 210 may be used to decode the output signals. For example, for a capacitive touch screen that includes 16 drive lines, 15 of the drive lines 120 may be driven by 15 drive signals 130 that are encoded using the plurality of codes 210. The output signal 220A will still include values for the 16 drive lines (values for the 15 drive lines driven by drive signals, and values for the one drive line not driven by drive signals). According to various examples, the drive line not driven by a drive signal may be disconnected. The output signal 220A for the drive line that is not driven or disconnected will include the offset component 610b, but will not include any touch component 320. Therefore, the offset component 610b can be subtracted from the output signals 220A corresponding to the other 15 drive lines without affecting any touch information 320.

Figure 10A:
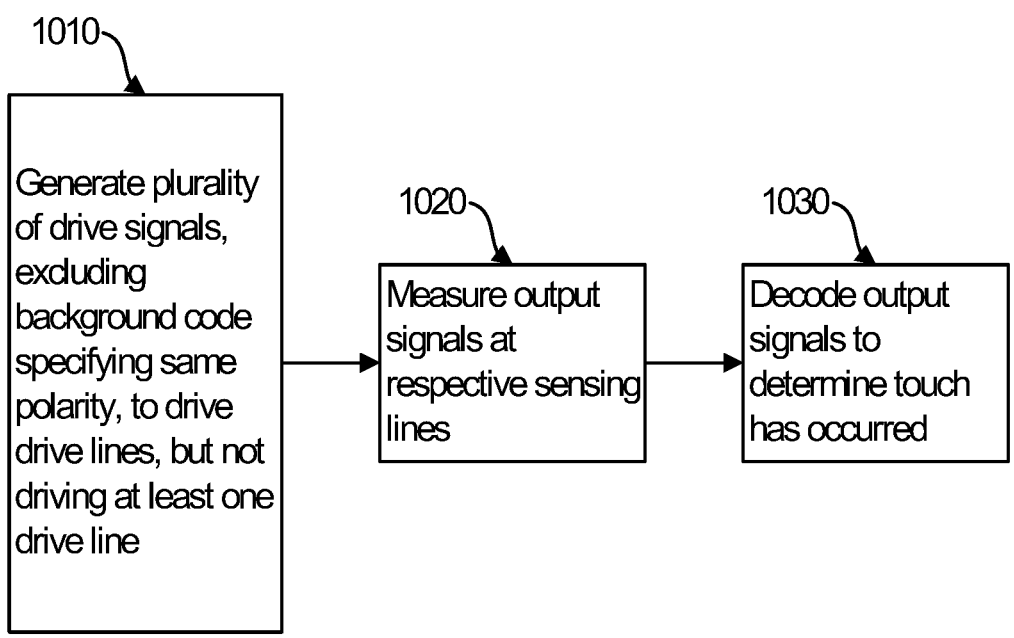
FIG. 10A shows a method of detecting a user touch on a capacitive touch screen according to various examples in which a mean background screen response component is substantially removed by excluding a background code.

FIG. 10A shows a method of detecting a user touch on a capacitive touch screen according to various examples. The method of FIG. 10A is similar to the method of FIG. 8A in that the background code is not used to encode the drive signals 120, and similar to the method of FIG. 9A because one of the drive lines 120 is not driven by a drive signal 130. For example, in step 1010 a plurality of drive signals 130 are generated to respectively drive a plurality of drive lines 120 of the capacitive touch screen 100. The plurality of drive signals may be encoded by a plurality of codes 210 that respectively specify the polarities of the drive signals 130 at different times. The number of drive lines 120 may be greater than the number of codes 210. For example, the capacitive touch screen may include 16 drive lines 120, and the plurality of codes 210 may include 15 codes. The plurality of codes 210 in FIG. 10A may exclude a background code that that specifies the same polarity for the respective drive signals 120. The plurality of codes 210 used in the method of FIG. 10A may be mutually orthogonal, and may respectively specify that half of the drive signals have a first polarity and half of the drive signals have a second polarity that is opposite the first polarity.

The method of FIG. 10A may include a step 1020 of measuring a plurality of output signals 220A at a respective plurality of sensing lines 110 of the capacitive touch screen 100. The plurality of output signals 220A may respectively include a plurality of values corresponding to the plurality of codes 210 for the respective drive signals 130. By excluding the background code, and using one fewer code than the number of drive lines, the output signals 220A do not include the mean background screen response component 310. In step 1030, one or more of the plurality of output signals 220A is decoded to determine a touch of the capacitive touch screen 100 has occurred based on the values of the plurality of output signals, as explained above.

Figure 10B:
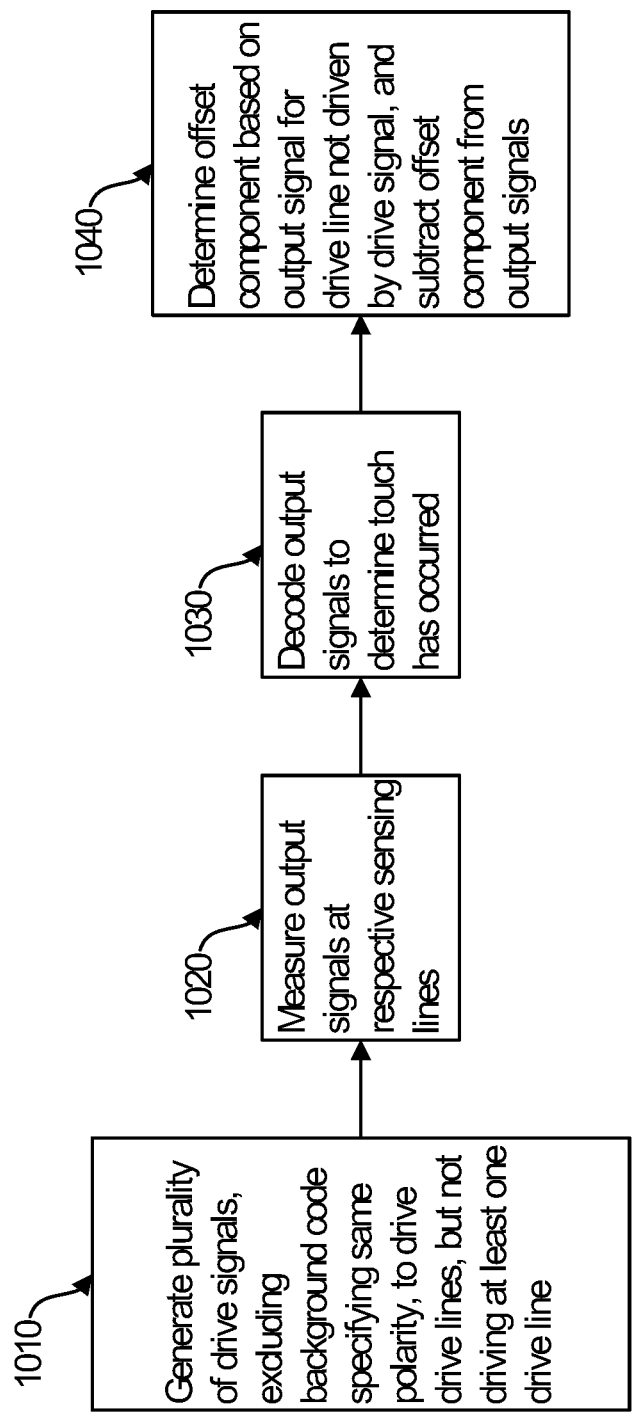
FIG. 10B shows a method of detecting a user touch on a capacitive touch screen according to various examples in which a mean background screen response component is substantially removed by excluding a background code, and an offset component is substantially removed using an offset component corresponding to at least one drive that does not receive a drive signal.

FIG. 10B shows a method of detecting a user touch on a capacitive touch screen according to various examples. The method of FIG. 10B is an extension of the method of FIG. 10A, and the steps previously described in connection with FIG. 10A are not repeated here. In the method of FIG. 10B, after the decoding step 1030, in step 1040 an offset component is determined based on an output signal 220A for the at least one drive line that is not driven by any of the drive signals 130, and the determined offset component is subtracted from one or more of the plurality of output signals 220. Even though the plurality of codes 210 are not applied to one of the drive lines 120, the plurality of codes 210 may be used to decode the output signals. For example, for a capacitive touch screen that includes 16 drive lines, 15 of the drive lines 120 may be driven by 15 drive signals 130 that are encoded using the plurality of codes 210. The output signal 220A will still include values for the 16 drive lines (values for the 15 drive lines driven by drive signals, and values for the one drive line not driven by drive signals). According to various examples, the drive line not driven by a drive signal may be disconnected. The output signal 220A for the drive line that is not driven or disconnected will include the offset component 610b, but will not include any touch component 320. Therefore, the offset component 610b can be subtracted from the output signals 220A corresponding to the other 15 drive lines without affecting any touch information 320.

Figure 11:
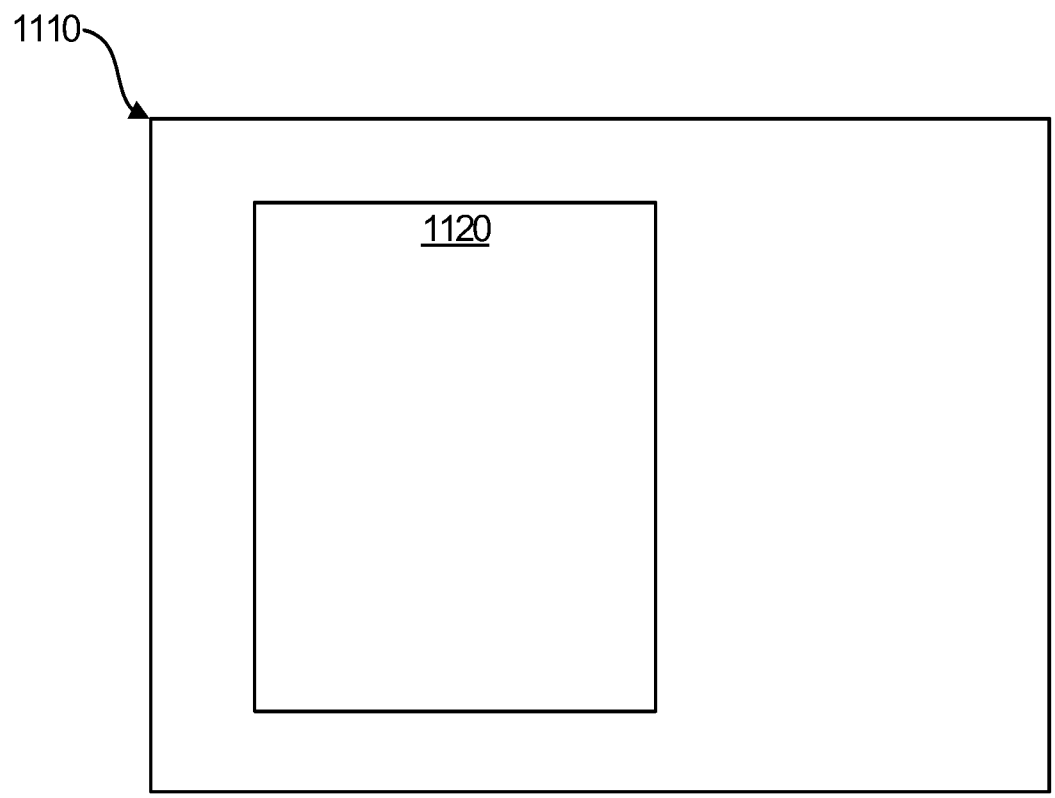
FIG. 11 shows a capacitive touch screen controller to detect a user touch on a capacitive touch screen according to various examples.

FIG. 11 shows a capacitive touch screen controller to detect a user touch on a capacitive touch screen according to various examples. The capacitive touch screen controller 1110 may include processing circuitry 1120, which as described above may include may include one or more integrated circuits (ICs), such as for example general-purpose microprocessors, microcontrollers, programmable logic devices or arrays, application-specific ICs (ASICs). In various examples, the capacitive touch screen controller 1110 may include a computer system having processing circuitry such as, for example, a processor, memory, storage, and communication interfaces. In various examples, the capacitive touch screen controller 1110 may include analog circuitry, digital logic, and digital non-volatile memory. According to various examples, the processing circuitry 1120 may perform the methods described in connection with FIGS. 5A, 5B, 8A, 8B, 9A, 9B, 10A, and 10B, which are not repeated here to avoid redundancy.

Various examples have been disclosed herein, in connection with the above description and the drawings. It will be understood that it would be unduly repetitious to literally describe and illustrate every combination and subcombination of these examples. Accordingly, all examples can be combined in any way and/or combination, and the present specification, including the drawings, shall be construed to constitute a complete written description of all combinations and subcombinations of the examples described herein, and of the manner and process of making and using them, and shall support claims to any such combination or subcombination.

It will be appreciated by persons skilled in the art that the examples described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method of detecting a user touch on a capacitive touch screen, the method comprising:
generating a plurality drive signals to respectively drive a plurality of drive lines of the capacitive touch screen, wherein the plurality of drive signals are encoded by a plurality of codes that respectively specify polarities of the plurality of drive signals at different times, wherein the plurality of codes include a background code that specifies the same polarity for the respective drive signals, and the remaining codes of the plurality of codes are orthogonal to the background code;
measuring a plurality of output signals at a respective plurality of sensing lines of the capacitive touch screen, wherein the plurality of output signals respectively include a plurality of values corresponding to the plurality of codes for the respective drive signals; and
decoding the plurality of output signals to determine a touch of the capacitive touch screen has occurred based on the values of the plurality of output signals, wherein the decoding excludes values of the plurality of output signals corresponding to the background code.

2. The method of claim 1, including replacing the values of the plurality of output signals corresponding to the background code with replacement values, so as to thereby exclude values of the plurality of output signals corresponding to the background code.

3. The method of claim 2, wherein the replacement values are zeroes.

4. The method of claim 1, comprising:
subtracting an offset component from one or more of the plurality of output signals corresponding to one or more sensing lines of the capacitive touch screen.

5. The method of claim 4, wherein the offset component corresponds to an offset component of an output signal corresponding to an untouched part of the capacitive touch screen.

6. A method of detecting a user touch on a capacitive touch screen, the method comprising:
generating a plurality of drive signals to respectively drive a plurality of drive lines of the capacitive touch screen, wherein the plurality of drive signals are encoded by a plurality of codes that respectively specify polarities of the plurality of drive signals at different times, wherein the number of drive lines is greater than the number of codes, and wherein the plurality of codes are mutually orthogonal and respectively specify that half of the drive signals have a first polarity and half of the drive signals have a second polarity that is opposite the first polarity;
measuring a plurality of output signals at a respective plurality of sensing lines of the capacitive touch screen, wherein the plurality of output signals respectively include a plurality of values corresponding to the plurality of codes for the respective drive signals; and
decoding the plurality of output signals to determine a touch of the capacitive touch screen has occurred based on the values of the plurality of output signals.

7. The method of claim 6, comprising:
subtracting an offset component from one or more of the plurality of output signals corresponding to one or more sensing lines of the capacitive touch screen.

8. The method of claim 7, wherein the offset component corresponds to an offset component of an output signal corresponding to an untouched part of the capacitive touch screen.

9. A method of detecting a user touch on a capacitive touch screen, the method comprising:
generating a plurality of drive signals to respectively drive a plurality of drive lines of the capacitive touch screen, wherein capacitive touch screen includes at least one drive line that is not driven by any of the drive signals, wherein the plurality of drive signals are encoded by a plurality of codes that respectively specify polarities of the plurality of drive signals at different times, wherein the plurality of codes include a background code that specifies the same polarity for the respective drive signals, and the remaining codes of the plurality of codes are orthogonal to the background code;

measuring a plurality of output signals at a respective plurality of sensing lines of the capacitive touch screen, wherein the plurality of output signals respectively include a plurality of values corresponding to the plurality of codes for the respective drive signals; and decoding the plurality of output signals to determine a touch of the capacitive touch screen has occurred based on the values of the plurality of output signals, wherein the decoding excludes values of the plurality of output signals corresponding to the background code.

10. The method of claim 9, including replacing the values of the plurality of output signals corresponding to the background code with replacement values, so as to thereby exclude values of the plurality output signals corresponding to the background code.

11. The method of claim 10, wherein the replacement values are zeroes.

12. The method of claim 9, comprising:
determining an offset component based on an output signal for the at least one drive line that is not driven by any of the drive signals; and
subtracting the offset component from one or more of the plurality of output signals corresponding to one or more sensing lines of the capacitive touch screen.

13. A method of detecting a user touch on a capacitive touch screen, the method comprising:
generating a plurality of drive signals to respectively drive a plurality of drive lines of the capacitive touch screen, wherein the capacitive touch screen includes at least one drive line that is not driven by any of the drive signals, wherein the plurality of drive signals are encoded by a plurality of codes that respectively specify polarities of the plurality of drive signals at different times, wherein the number of drive lines is greater than the number of codes, and wherein the plurality of codes are mutually orthogonal and respectively specify that half of the drive signals have a first polarity and half of the drive signals have a second polarity that is opposite the first polarity;
measuring a plurality of output signals at a respective plurality of sensing lines of the capacitive touch screen, wherein the plurality of output signals respectively include a plurality of values corresponding to the plurality of codes for the respective drive signals; and
decoding the plurality of output signals to determine a touch of the capacitive touch screen has occurred based on the values of the plurality of output signals.

14. The method of claim 13, comprising:
determining an offset component based on an output signal for the at least one drive line that is not driven by any of the drive signals; and
subtracting the offset component from one or more of the plurality of output signals corresponding to one or more sensing lines of the capacitive touch screen.

15. A capacitive touch screen controller to detect a user touch on a capacitive touch screen, the capacitive touch screen controller comprising:
processing circuitry to:
generate a plurality of drive signals to respectively drive a plurality of drive lines of the capacitive touch screen, wherein the plurality of drive signals are encoded by a plurality of codes that respectively specify polarities of the plurality of drive signals at different times, wherein the plurality of codes include a background code that specifies the same polarity for the respective drive signals, and the remaining codes of the plurality of codes are orthogonal to the background code;
measure a plurality of output signals at a respective plurality of sensing lines of the capacitive touch screen, wherein the plurality of output signals respectively include a plurality of values corresponding to the plurality of codes for the respective drive signals; and
decode the plurality of output signals to determine a touch of the capacitive touch screen has occurred based on the values of the plurality of output signals, wherein values of the plurality of output signals corresponding to the background code are excluded to decode the plurality of output signals.

16. The capacitive touch screen controller of claim 15, wherein the processing circuitry is to replace the values of the plurality of output signals corresponding to the background code with replacement values, so as to thereby exclude values of the plurality of output signals corresponding to the background code.

17. The capacitive touch screen controller of claim 16, wherein the replacement values are zeroes.

18. The capacitive touch screen controller of claim 15, wherein the processing circuitry is to:
subtract an offset component from one or more of the plurality of output signals corresponding to one or more sensing lines of the capacitive touch screen.

19. A capacitive touch screen controller to detect a user touch on a capacitive touch screen, the capacitive touch screen controller comprising:
processing circuitry to:
generate a plurality of drive signals to respectively drive a plurality of drive lines of the capacitive touch screen, wherein the plurality of drive signals are encoded by a plurality of codes that respectively specify polarities of the plurality of drive signals at different times, wherein the number of drive lines is greater than the number of codes, and wherein the plurality of codes are mutually orthogonal and respectively specify that half of the drive signals have a first polarity and half of the drive signals have a second polarity that is opposite the first polarity;
measure a plurality of output signals at a respective plurality of sensing lines of the capacitive touch screen, wherein the plurality of output signals respectively include a plurality of values corresponding to the plurality of codes for the respective drive signals; and
decode the plurality of output signals to determine a touch of the capacitive touch screen has occurred based on the values of the plurality of output signals.

20. The capacitive touch screen controller of claim 19, wherein the processing circuitry is to subtract an offset component from one or more of the plurality of output signals corresponding to one or more sensing lines of the capacitive touch screen.

21. The capacitive touch screen controller of claim 20, wherein the offset component corresponds to an offset component of an output signal corresponding to an untouched part of the capacitive touch screen.

22. A capacitive touch screen controller to detect a user touch on a capacitive touch screen, the capacitive touch screen controller comprising:

processing circuitry to:
generate a plurality of drive signals to respectively drive a plurality of drive lines of the capacitive touch screen, wherein capacitive touch screen includes at least one drive line that is not driven by any of the drive signals, wherein the plurality of drive signals are encoded by a plurality of codes that respectively specify polarities of the plurality of drive signals at different times, wherein the plurality of codes include a background code that specifies the same polarity for the respective drive signals, and the remaining codes of the plurality of codes are orthogonal to the background code;

measure a plurality of output signals at a respective plurality of sensing lines of the capacitive touch screen, wherein the plurality of output signals respectively include a plurality of values corresponding to the plurality of codes for the respective drive signals; and decode the plurality of output signals to determine a touch of the capacitive touch screen has occurred based on the values of the plurality of output signals.

23. The capacitive touch screen controller of claim 22, wherein the processing circuitry is to replace the values of the plurality of output signals corresponding to the background code with replacement values, so as to thereby exclude values of the plurality output signals corresponding to the background code.

24. The capacitive touch screen controller of claim 23, wherein the replacement values are zeroes.

25. The capacitive touch screen controller of claim 22, wherein the processing circuitry is to:
determine an offset component based on an output signal for the at least one drive line that is not driven by any of the drive signals; and
subtract the offset component from one or more of the plurality of output signals corresponding to one or more sensing lines of the capacitive touch screen.

26. A capacitive touch screen controller to detect a user touch on a capacitive touch screen, the capacitive touch screen controller comprising:

processing circuitry to:
generate a plurality of drive signals to respectively drive a plurality of drive lines of the capacitive touch screen, wherein the capacitive touch screen includes at least one drive line that is not driven by any of the drive signals, wherein the plurality of drive signals are encoded by a plurality of codes that respectively specify polarities of the plurality of drive signals at different times, wherein the number of drive lines is greater than the number of codes, and wherein the plurality of codes are mutually orthogonal and respectively specify that half of the drive signals have a first polarity and half of the drive signals have a second polarity that is opposite the first polarity;

measure a plurality of output signals at a respective plurality of sensing lines of the capacitive touch screen, wherein the plurality of output signals respectively include a plurality of values corresponding to the plurality of codes for the respective drive signals; and decoding the plurality of output signals to determine a touch of the capacitive touch screen has occurred based on the values of the plurality of output signals.

27. The capacitive touch screen controller of claim 26, wherein the processing circuitry is to:
determine an offset component based on an output signal for the at least one drive line that is not driven by any of the drive signals; and
subtract the offset component from one or more of the plurality of output signals corresponding to one or more sensing lines of the capacitive touch screen.

* * * * *